United States Patent
Denteneer et al.

(10) Patent No.: US 9,526,116 B2
(45) Date of Patent: Dec. 20, 2016

(54) METHOD FOR GRANTING MEDIUM ACCESS IN A WIRELESS NETWORK AND NETWORK THEREFOR

(75) Inventors: Theodorus Jacobus Johannes Denteneer, Eindhoven (NL); Augustus Josephus Elizabeth Maria Janssen, Eindhoven (NL); Peter Maria Van De Ven, Eindhoven (NL); Johannes Simeon Hendrikus Van Leeuwaarden, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 74 days.

(21) Appl. No.: 13/382,628

(22) PCT Filed: Jul. 9, 2010

(86) PCT No.: PCT/IB2010/053157
§ 371 (c)(1),
(2), (4) Date: Jan. 6, 2012

(87) PCT Pub. No.: WO2011/004349
PCT Pub. Date: Jan. 13, 2011

(65) Prior Publication Data
US 2012/0106497 A1 May 3, 2012

(30) Foreign Application Priority Data
Jul. 9, 2009 (EP) .................................... 09305666

(51) Int. Cl.
*H04W 74/08* (2009.01)
*H04W 74/02* (2009.01)
*H04W 28/22* (2009.01)
*H04W 52/26* (2009.01)
*H04W 52/50* (2009.01)
*H04W 52/60* (2009.01)
*H04W 72/04* (2009.01)
*H04L 12/54* (2013.01)
*H04L 12/64* (2006.01)
*H04L 12/70* (2013.01)

(52) U.S. Cl.
CPC ................................ *H04W 74/0825* (2013.01)

(58) Field of Classification Search
CPC ... H04W 74/0825; H04W 74/08; H04W 88/08
USPC ............. 370/252, 253, 310.2, 328–330, 338, 348,370/431–437, 443–448, 461, 462, 464, 468
See application file for complete search history.

(56) References Cited

U.S. PATENT DOCUMENTS

| | | | |
|---|---|---|---|
| 6,728,514 B2 * | 4/2004 | Bandeira et al. | 455/13.1 |
| 7,626,931 B2 * | 12/2009 | Wu et al. | 370/232 |
| 7,660,285 B2 * | 2/2010 | Xiong et al. | 370/338 |
| 7,881,340 B2 * | 2/2011 | Farrag et al. | 370/468 |
| 8,077,665 B2 * | 12/2011 | Murugesu et al. | 370/329 |
| 8,208,487 B2 * | 6/2012 | Zhang | H04W 24/02 370/464 |
| 2005/0210157 A1 | 9/2005 | Sakoda | |
| 2007/0263657 A1 * | 11/2007 | Sugar | H04L 12/5695 370/465 |
| 2008/0137680 A1 | 6/2008 | Santhanam | |
| 2008/0219170 A1 * | 9/2008 | Marcellin | 370/238.1 |
| 2009/0103501 A1 * | 4/2009 | Farrag et al. | 370/337 |
| 2009/0303908 A1 * | 12/2009 | Deb | H04W 28/18 370/310 |

FOREIGN PATENT DOCUMENTS

| WO | WO2007012819 A1 | 2/2007 |
|---|---|---|
| WO | WO2008069578 A1 | 6/2008 |

OTHER PUBLICATIONS

A. Banchs et al., "Providing Throughput Guarantees in IEEE 802.11 Wireless LAN", Wireless Communications and Networking Conference, 2002. WCNC2002. 2002 IEEE, Piscataway, NJ, USA, IEEE, vol. 1, Mar. 17, 2002 (Mar. 17, 2002), pp. 130-138, XP010585749.
Denteneer et al., "Throughput Balancing in Wireless Networks", Feb. 12, 2009.

* cited by examiner

*Primary Examiner* — Un C Cho
*Assistant Examiner* — Peian Lou
(74) *Attorney, Agent, or Firm* — Larry Liberchuk

(57) ABSTRACT

The present invention relates to a method for granting medium access to a node in a wireless network, the network comprising at least two nodes, and the method comprising the step of determining, for one of the at least two nodes, a medium access rate to be used, a medium access rate determining how often a node transmits data throughout the network, wherein the rate is determined as being different from one node to another and dependent on the number of neighbors of a node. The invention also relates to a wireless radio network comprising at least two nodes, wherein a medium access rate to be used by a node is determined as being different from one node to another and dependent on the number of neighbors of a node, a medium access rate determining how often a node transmits data throughout the network.

9 Claims, 1 Drawing Sheet

METHOD FOR GRANTING MEDIUM ACCESS IN A WIRELESS NETWORK AND NETWORK THEREFOR

FIELD OF THE INVENTION

The present invention relates to a method for granting medium access in a wireless network. More particularly, this invention relates to a method for setting access rates in a wireless network.

This invention is, for example, relevant for mesh network, wherein some nodes are surrounded by a large number of neighbours.

BACKGROUND OF THE INVENTION

In standard CSMA/CA type medium access algorithms, radio nodes use random numbers to determine when to access the medium. In standard 802.11 and WiFi systems, this random number is usually drawn from a window. The size of the window then determines how frequently the nodes access the medium (i.e. the rate at which they access the medium) and serves to avoid collisions. All radio nodes use the same algorithm and access the medium at the same rate, so is seems that this procedure is completely fair and provides all radio nodes with identical opportunity to access the medium.

However, it has been noticed that, in a mesh environments, these algorithms are not fair at all. Indeed, radio nodes having many neighbours, i.e. radio nodes situated in the middle of the mesh network, suffer from near starvation, also called "flow-in-the-middle" phenomenon. This means that their throughput drops to unacceptably low levels, as soon as the traffic in the network increases.

For example, let's consider a simple arrangement of 5 radio nodes, configured in a chain topology, as shown on FIG. 1. Each node accesses the medium at a given rate which is the same for all radio nodes. If a node senses the medium occupied, it backs off and schedules a new random sensing instant according to the given rate. In this configuration the sensing rate is set so that each node can sense the activity of its neighbours up to three hops away. This carrier sensing range is sufficiently large so that no collisions of transmitted packets can occur. This medium access mechanism seems completely fair, as each node senses the medium at the same rate and executes exactly the same algorithm for the medium access. However, it can be observed in table 1 below, showing the actual throughputs achieved by the radio nodes, that even though the medium access rates and rules are identical for all stations, the actual achieved rates are not.

TABLE 1

Access rate and achieved percentage of air time of the nodes in the mesh depicted in FIG. 1.

| Access rate | Airtime node 1 | Airtime node 2 | Airtime node 3 | Airtime node 4 | Airtime node 5 |
|---|---|---|---|---|---|
| 1 | 29% | 14% | 14% | 14% | 29% |
| 5 | 59% | 10% | 10% | 10% | 59% |
| 10 | 73% | 7% | 7% | 7% | 73% |
| 20 | 84% | 4% | 4% | 4% | 84% |

Other algorithms exist in current standard 802.11. For example, in the exponential back off algorithm, back off windows are used to avoid collisions between neighbouring radio nodes that have data to transmit. Initially, the radio nodes use some minimal back off window to avoid collisions. In case collisions still happen, the windows are increased, usually doubled, up to some maximum window size, to reduce the collision probability. However, it has been noticed that stations with many neighbours suffer from relatively more collisions than the radio nodes on the edge of the network. Thus, this windowing algorithm precisely reduces the rate of the stations that already suffer from throughput drops.

Such drawback becomes apparent in view of the example shown on FIG. 2. Here, three mutually orthogonal flows are configured, i.e. flows aA, bB and cC. In this case, each node identically executes the standard 802.11 medium access, and the access rates are arranged via a back off window. Thus, when a node has data to transmit, it draws a random back off time from this back off window, identically and independently from the other nodes. This back off time then determines the instant at which the node can transmit and so sets the sensing rate. Node c lies in the carrier sense range of both nodes a and b, and cannot transmit when either a or b are transmitting. As a and b transmit asynchronously, station c has fewer opportunities to transmit and flow cC will be starved. Again, the node in the middle has a severe disadvantages, because of the topology of the nodes.

SUMMARY OF THE INVENTION

It is an object of the invention to propose a method for granting access to a medium, overcoming the drawbacks above-mentioned.

Thus, it is an object of the invention to propose a method preventing the flow-in-the-middle phenomenon, and thus preventing the throughput problems experienced in mesh networks.

It is another object of the invention to propose a method for granting correct access in a mesh environment, or in any environment with many radio nodes.

Yet another object of the invention is to provide a method for setting access rates of nodes to a medium, in a radio network.

Yet another object of the invention is to provide a method for setting back-off window sizes for access in a radio network.

To this end, the invention proposes a method for granting medium access to a node in a wireless network, the network comprising at least two nodes, and the method comprising the step of determining, for a node, a medium access rate to be used, wherein the rate is determined as being different from one node to another and dependent on the number of neighbors of a node.

A medium access rate is a value determining how often a node senses the medium in order to transmit data throughout the network.

In a radio network, a neighbor of a first node is a second node situated in the carrier sense range of a first node. In a mesh network, a neighbor can also be identified by the number of hops separating a second node from the first node.

A method according to the invention makes it possible to set different access rates for different nodes of a network, thus circumventing the "flow-in-the-middle" problem. Indeed, in a particular embodiment, a method according to the invention comprises the following steps:

each node determining the number of nodes of the network in its carrier sense range, distributing the minimum number of nodes in the carrier sense range of any node in the mesh, based on this information, determining, for each node of the network, a respective medium access rate to be used.

Such distributing of the minimum number of nodes in the carrier sense range of any node in the mesh can be carried out by a master station determining the access rates and instructing each node to use its respective medium access rate. In another embodiment, more common in a mesh network, each node advertises the number of nodes of the network in its carrier sense range and the estimated minimum number of nodes in the carrier sense range of any node in the mesh. Thus, the distributing is carried out by each node in the network and the determining of the respective medium access rate can be performed in a distributed way at each node in the network.

More particularly, the respective access rate to be used is calculated as follows, for each node the access rate of node $i = \sigma(1+\sigma)^{\gamma(i)-\gamma^*}$ wherein $\sigma$ is a positive quantity corresponding to a base rate, $\gamma(i)$ is the number of stations in the carrier sense range of station i, and $\gamma^*$ is the minimum number of nodes in the carrier sense range of any node in the mesh.

In another particular embodiment, the access rate is realized by a back off window of size W. More specifically, the method in such a case comprises the following steps:
  each node determining the number of nodes of the network in its carrier sense range,
  distributing the minimum number of nodes in the carrier sense range of any node in the mesh,
  distributing the maximum number of nodes in the carrier sense range of any node in the mesh,
  determining a first window size for the node in the network with the maximal number of neighbors,
  determining a second window size for the node in the network with the minimal number of neighbors,
  determining, for each node, a window size comprised between the first and second window sizes.

Another aspect of the invention relates to a wireless radio network, comprising at least two nodes, A wireless radio network comprising at least two nodes, wherein a medium access rate to be used by a node is determined as being different from one node to another and dependent on the number of neighbors of a node, a medium access rate determining how often a node transmits data throughout the network.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

The present invention relates to a new mechanism for setting the medium access rates for radio nodes in a mesh environment, or in any environment with many radio nodes. The invention can also be used to determine the size of the back off windows in case the access rates are regulated via back off windows. The invention is based on a theoretical analysis of the problem in which the best rate at which all nodes in a simple mesh network transmit is theoretically derived.

Let's assume a linear mesh network, or a flow in a mesh network, in which the nodes have their carrier sensing range set so that hidden terminals do not occur. Each node has a carrier sensing range with $\gamma(i)$ nodes in it. Then, in the present invention, the rate at which a node, labelled i, accesses the medium is equal to $$\sigma(1-\sigma)^{\gamma(i)-\gamma^*} \qquad (1)$$

where $\sigma$ is a positive quantity (a base rate), $\gamma(i)$ is the number of stations in the carrier sense range of station i, and $\gamma^*$ is the minimum number of nodes in the carrier sense range of any node in the mesh.

Figure 1:
FIG. 1 shows a chain topology of a radio network.
Figure 2:
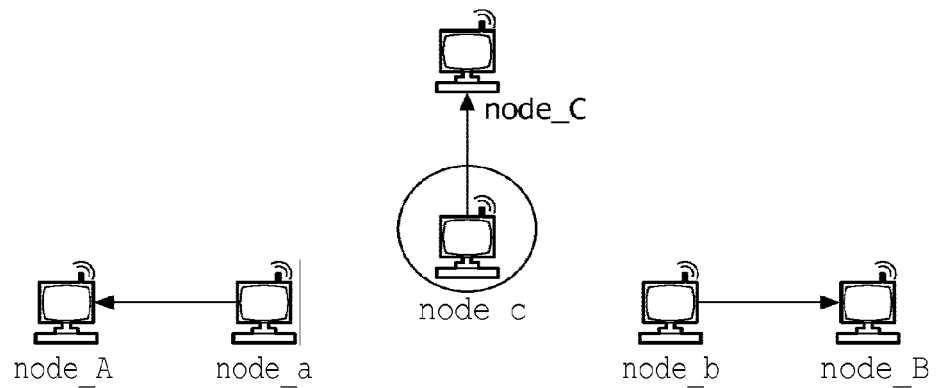
FIG. 2 shows another mesh topology.

In simple topologies, for example in the chain topology depicted in FIG. 1, where nodes are equal spaced and the carrier sensing range is exactly, it can be shown that if each node sets its rate accordingly, the throughput of each node equals $$\vartheta_i = \frac{\sigma}{1+(1+\kappa)\sigma}.$$

Additionally, if the basic access rate is high it can be seen that the per node throughput approaches $1/(1+\kappa)$ which is the theoretical optimum that can be achieved in such a mesh.

Thus, if the radio nodes in the mesh set the access rates according to (1), the data transport in a mesh is completely fair in that each node achieves the same throughput. Moreover, the throughput thus achieved is the best fair throughput that can be achieved in a mesh.

Accordingly, in the present invention, the access rate for each node of a network is set in view of a given relation to the number of stations in its carrier sensing range and the minimum number of nodes in the carrier sense range of any node in the mesh. In particular, a station with many neighbours sets its access rate to a relatively high value, and a station with few neighbours should set its access rate to a relatively low value. If stations manipulate the rate with which they access the medium in this way, they will all realize the same throughput. Moreover, this throughput is the best throughput that can be realized.

A method according to the invention thus makes it possible to set the access rate for a node in an optimal way, by setting it dependent on:
  1. The number of nodes in the carrier sense range of this node
  2. The minimum number of nodes in the carrier sense range of any node in the mesh.

Consequently, it is herein proposed a method that distributes this information 1) and 2) in the mesh network and that sets the rates at each node according to the rule that:
  a) Stations with few nodes in their carrier sensing range set the access rate to a relatively low value, and
  b) Stations with many nodes in their carrier sensing range set the access rate to a relatively high value.

The performance of the mesh can be further improved by arranging the access rates according to the equation (1). Table 2 below displays corresponding figures. Clearly, each node achieves a fair share of the throughput. This is achieved by giving the nodes at the edges an access rate which is lower than the nodes in the middle of the chain.

TABLE 2

Access rate and achieved percentage of air time of the nodes
in the mesh depicted in FIG. 1 using the method proposed in this
invention using Equation (1).

| Access rate | Airtime node 1 | Airtime node 2 | Airtime node 3 | Airtime node 4 | Airtime node 5 |
|---|---|---|---|---|---|
| 1 | 18% | 18% | 18% | 18% | 18% |
| 5 | 22% | 22% | 22% | 22% | 22% |
| 10 | 23% | 23% | 23% | 23% | 23% |
| 20 | 23% | 23% | 23% | 23% | 23% |

Another embodiment of the invention relates to the case where the access rate is realised by a window. In such embodiment, a station draws a random back off between 0 and W−1, where W is the back off window size. After a station senses the medium idle, it counts down for a number of time slots equal to the back off. It suspends counting down as soon as the medium is busy again. As soon as the counter reaches 0, the station can transmit its package. The random back off is also useful for preventing collisions in addition to prioritising access to the medium for the various nodes. For example, let's assume that the medium becomes idle around node i, and that node i has many, n, neighbours. In this case, each node accesses the medium with a probability of $p=1/W$. In this case, the probability of a successful transmission becomes $$(n-1)p(1-p)^n.$$

It thus follows that if there are many neighbours (n is large) then the probability of accessing the medium, p, should be low at each node so as to avoid many collisions due to back off timers that expire simultaneously. In particular, nodes can set their access rate probabilities so that the probability of a collision is low, or as low as possible. For example, analysing the probability of a successful transmission stated above, we find that the nodes should set their access rates to a value $p=1/(n+1)$.

Using this information, a station can calculate the optimal window size for the station in the mesh which has the most neighbours. From this window size, it can calculate the window size W* for this node so that the collision rate at this node is optimal. From this window size it can calculate an access rate, as $2/(W^*\tau)$.

Here τ is the duration of one slot in the back off window, i.e. the slot time. From the access rate of the node with the maximal number of nodes in its interference range, it can compute the access rate of the node with the minimal number of neighbours. For this, it can use some preconfigured means to set a lower rate, e.g. employing e.g. Eq (1). From this access rate, each node can then set its own access rate, e.g. as in the situation sketched above, under 1. Again, given this access rate, λ say, it can calculate its own window size, here it will use $$W=2/(\lambda\tau).$$

To achieve this, in addition to the situation above, each station now also needs to know the maximum number of nodes in the carrier sense range of any node in the mesh.

Consequently, the invention proposes a protocol for the common case that the sensing rates are regulated via a back off window, as is currently the case in 802.11. It has been shown that the window size for each node depends on 1. The number of nodes in the carrier sense range of this node
2. The maximum number of nodes in the carrier sense range of any node in the mesh
3. The minimum number of nodes in the carrier sense range of any node in the mesh Consequently, it is herein proposed a protocol that distributes this information 1) 2) and 3) in the mesh network and that sets the window sizes according to the rules.
   a) Stations determine the window size for the node in the mesh with the maximal number of neighbours,
   b) Stations determine the window size for the node in the mesh with the minimal number of neighbours which will be larger than the window size calculated in a),
   c) Stations with few nodes in their carrier sensing range set their window size to a relatively large value between the window size calculated in a) and b) and
   d) Stations with many nodes in their carrier sensing range set their window size to a relatively low value between the window sizes calculated in a) and b).

In a refinement of the algorithm, the stations determine the window size for the node in the mesh with the maximal number of neighbours according to $W=1/(n+1)$. The performance of the mesh can be further improved by arranges the access rates according to the equation (1).

The present invention is more especially dedicated to be used in mesh network, but it can also be applied to any network environment wherein a node comprises many neighbours.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio networks and which may be used instead of or in addition to features already described herein.

The invention claimed is:

1. A method for granting medium access to a node in a wireless network, the network comprising at least two nodes, and the method comprising:
   determining, for one node of the at least two nodes, a medium access rate to be used, the medium access rate determining how often a node senses the medium in order to transmit data throughout the network;
   each node determining a number of nodes of the network in its carrier sense range;
   distributing a minimum number of nodes in the carrier sense range of any node in the network;
   wherein the medium access rate for the one node is determined as being different from the medium access rate for each of the remaining nodes in the network and dependent on a number of nodes of the network in a carrier sense range of the one node; and
   based on the distributed minimum number of nodes, determining, for each node of the network, the respective medium access rate to be used, wherein the medium access rate to be used by each node is calculated as follows:

$$\text{medium access rate of node } i = \sigma(1+\sigma)^{\gamma(i)-\gamma^*},$$

wherein σ is a positive quantity corresponding to a basic access rate, γ(i) is the number of nodes in the carrier sense range of node i, and γ* is the minimum number of nodes in the carrier sense range of any node in the network.

2. A method for granting medium access to a node in a wireless network, the network comprising at least two nodes, and the method comprising:
    determining, for each node of the at least two nodes a medium access rate to be used, the medium access rate determining how often a node senses the medium in order to transmit data throughout the network,
    wherein the medium access rate for a particular one node of the at least two nodes is determined as being different from the medium access rate for other nodes of the at least two nodes in the network and the medium access rate is dependent on a number of nodes of the network in a carrier sense range of the particular one node of the at least two nodes and a minimum number of nodes in the carrier sense range of any node from among all nodes of the at least two nodes in the network; and
    distributing, by each node of the at least two nodes in said network, information pertaining to the number of nodes of the network that are in the carrier sense range of said respective each node of the at least two nodes.

3. The method as recited in claim 1, further comprises:
    each node determining the number of nodes of the network in its carrier sense range,
    distributing the minimum number of nodes in the carrier sense range of any node in the network, and
    determining, for each node of the network, a respective medium access rate to be used.

4. The method as recited in claim 3, wherein the medium access rate to be used by each node is calculated as follows:

$$\text{medium access rate of node } i = \sigma(1+\sigma)^{\gamma(i)-\gamma^*},$$

wherein $\sigma$ is a positive quantity corresponding to a basic access rate, $\gamma(i)$ is the number of nodes in the carrier sense range of node i, and $\gamma^*$ is the minimum number of nodes in the carrier sense range of any node in the network.

5. The method as recited in claim 1, wherein the medium access rate is realized by a back off window of size W.

6. The method as recited in claim 5, further comprises:
    each node determining the number of nodes of the network in its carrier sense range,
    distributing the minimum number of nodes in the carrier sense range of any node in the network,
    distributing a maximum number of nodes in the carrier sense range of any node in the network,
    determining a first window size for the node in the network with the maximal number of neighbors,
    determining a second window size for the node in the network with a minimal number of neighbors,
    determining, for said each node of the at least two nodes, a window size comprised between the first and second window sizes.

7. A wireless radio network comprising:
    at least two nodes, each of the at least two nodes comprising
    a processing circuit and a transmitter, the processing circuit configured to
    determine a medium access rate to be used by each one of the at least two nodes, where the medium access rate for a particular one node of the at least two nodes is different from a medium access rate for other nodes of the at least two nodes and the medium access rate is dependent on a number of nodes in the wireless radio network in carrier sense range of the particular one node of the at least two nodes and a minimum number of nodes in the carrier sense range of any node from among all nodes of the at least two nodes in the wireless radio network, the medium access rate determining how often a node senses the medium in order to transmit data throughout the wireless radio network; and
    the processing circuit further configured to cause the transmitter to distribute, by each node of the at least two nodes in the network, information pertaining to the number of nodes of the wireless radio network that are in the carrier sense range of the respective each node of the at least two nodes.

8. The wireless radio network as recited in claim 7, wherein the medium access rate is realized by a back off window of size W.

9. The wireless radio network as recited in claim 8, wherein
    the wireless radio network is configured to:
        distribute the minimum number of nodes in the carrier sense range of any node in the network and distribute a maximum number of nodes in the carrier sense range of any node in the network, and
    each node of the at least two nodes is configured for the processing circuit to:
        determine the number of nodes of the network in its carrier sense range,
        determine a first window size for the node in the network with the maximal number of neighbors,
        determine a second window size for the node in the network with a minimal number of neighbors, and
        determine a window size comprised between the first and second window sizes.

* * * * *